No. 745,105. PATENTED NOV. 24, 1903.
A. JENSEN.
PASTEURIZER.
APPLICATION FILED JUNE 24, 1902.
NO MODEL. 2 SHEETS—SHEET 2.
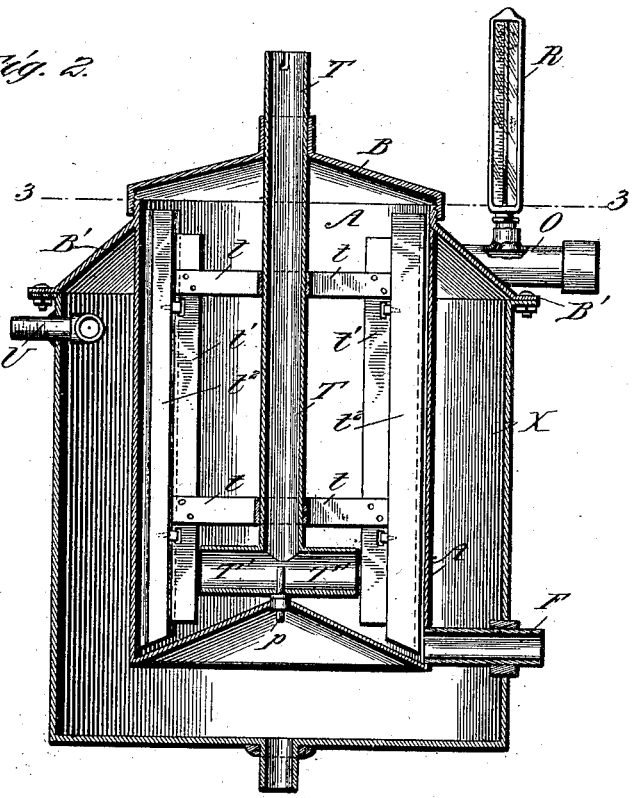
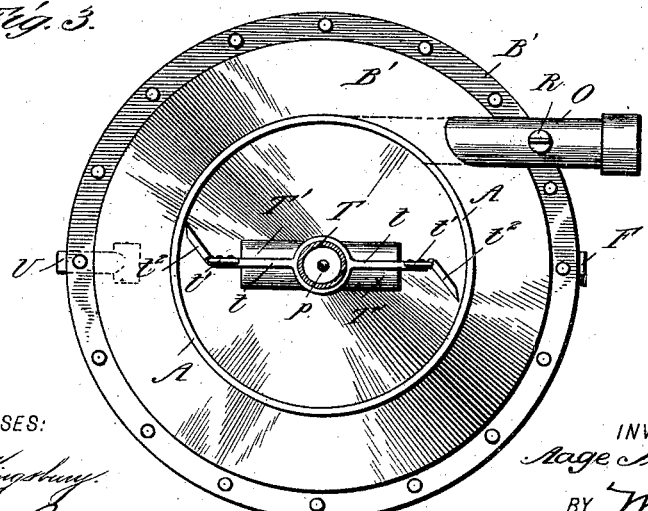
WITNESSES:
INVENTOR
Aage Jensen.
BY Munn & Co.
ATTORNEYS.

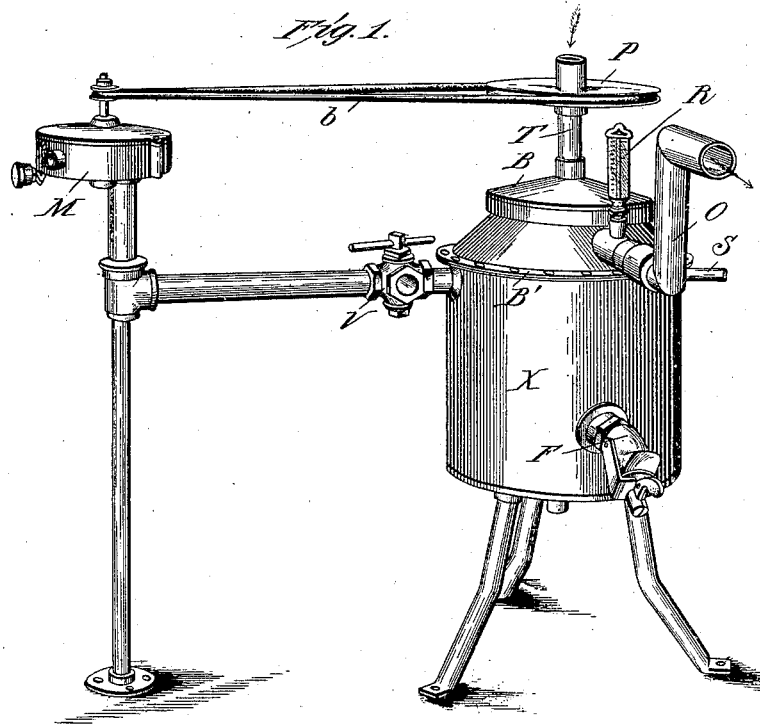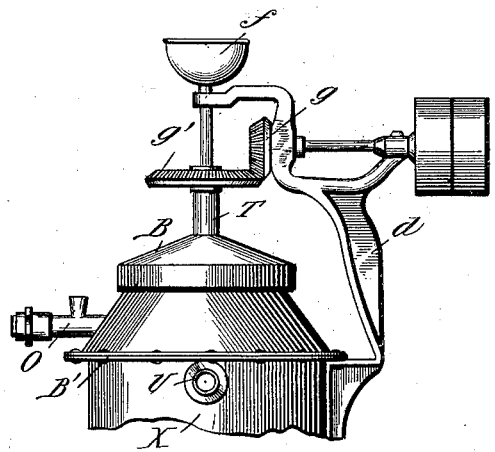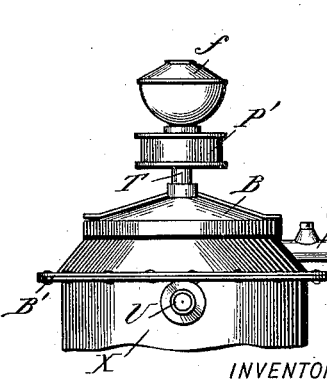

No. 745,105. Patented November 24, 1903.

UNITED STATES PATENT OFFICE.

AAGE JENSEN, OF TOPEKA, KANSAS.

PASTEURIZER.

SPECIFICATION forming part of Letters Patent No. 745,105, dated November 24, 1903.

Application filed June 24, 1902. Serial No. 113,009. (No model.)

*To all whom it may concern:*

Be it known that I, AAGE JENSEN, of Topeka, in the county of Shawnee and State of Kansas, have invented a new and useful Improvement in Pasteurizers, of which the following is a specification.

My invention is in the nature of a simple, practical, and efficient device for pasteurizing or sterilizing milk, cream, and other liquids; and it consists in the novel construction and arrangement of parts, which I will now proceed to describe with reference to the drawings, in which—

Figure 1 is a perspective view of the entire pasteurizer. Figs. 1$^a$ and 1$^b$ are modifications of the top of the pasteurizer, showing different means for transmitting motive power. Fig. 2 is an enlarged vertical central section through the pasteurizer proper, and Fig. 3 is a horizontal section of the same on line 3 3 of Fig. 2.

A is the cream-cylinder, into which the cream is introduced and heated. The size of this cylinder varies according to the size of machine and capacity required. This cylinder has a screw-top B and flange-breast B', which are detachably connected to the outside jacket with a number of bolts, as shown in Figs. 1 and 2. The cylinder has the outlet-pipe O as near the top as is possible to make it, as the cream enters at the bottom and while being heated becomes of a lighter specific gravity, and hence the necessity of having the outlet at the top.

In the cylinder A is the agitator for stirring the cream. This agitator consists of a seamless drawn-steel tube T, which has tinned steel arms $t\,t$ attached to it, and to these arms are secured vertical bars $t'\,t'$, to which are hinged two wooden wings $t^2\,t^2$, much the same shape as a ruler, sharp on one edge and made to lie close to the side of the cream-cylinder and prevent any particles of cream or casein from adhering to the heated surface, as seen in Fig. 3. The bearing at the top to support this agitator is made in the cover B, and at the bottom the agitator is supported by a stationary steel pin $p$, which is screwed firmly to the bottom of the heating-chamber. The lower end of tube T opens into the cylinder A through right angular branches T' T'. The gate-valve F, Fig. 1, is used only to draw off what cream may be in the pasteurizer when through operating same. X is the outer casing, which incloses the cylinder A and receives the steam through inlet U, and R is a thermometer mounted above the cream overflow-pipe, with the bulb extending into the same.

The cream is introduced at the top of the pasteurizer through the hollow agitator shaft or tube T. From there it goes to the bottom of the heating-cylinder and gradually fills up the machine. The agitator at the same time is revolving at a speed of from two hundred to four hundred revolutions per minute, varying according to the size of the machine. As the cream fills up it overflows through the outlet O and passes the thermometer-tube R, which will at all times give a correct reading of the temperature of the heated product. The heating of the cream or milk is done with steam, which enters near the top on the outside casing X. By having the steam introduced as near the line where the finished product is leaving there is no great variation in temperature without being noticed immediately on the thermometer. The steam as soon as it enters the jacket fills up the chamber between the heating-cylinder and the casing, and the heat is applied to the cream through the copper cylinder.

The agitator in the cylinder is rotated by a little steam-turbine motor with a solid brass flier, the teeth in which are milled out on a machine. This motor is shown at M, Fig. 1, and is supposed to run at a speed of between two thousand and four thousand revolutions per minute and applies its force with a small rawhide leather belt $b$ to a grooved pulley P on the agitator. The exhaust-steam from the motor is made to enter the pasteurizer through a three-way valve V, thereby saving all the steam used in operating the machine. If desired, steam may also be supplied to the cylinder through an independent pipe S, Fig. 1.

As a modification of the means for turning the agitator I may employ the arrangement shown in Fig. 1$^a$. A cast-iron arm $d$ is fastened to the body of the pasteurizer, and a horizontal shaft with a loose and tight pulley on one end and an iron bevel-gear $g$ on the other end meshes with a gear $g'$ on the tubular shaft. This machine has a permanent cream-inlet in the shape of a small copper funnel $f$. I may also employ a flat belt-pulley P' on the tubular shaft, as in Fig. 1$^b$. On this machine the motive power is applied with a belt direct from the line-shaft in the building to the pulley on the agitator.

Having thus described my invention, what I claim as new, and desire to secure by Letters Patent, is—

A pasteurizing apparatus comprising a cream-cylinder, having a cream-drainage connection at the bottom and a cream-overflow at the top and a flanged breast, an outer casing forming a steam-space, and removably connected to the flanged breast, a removable cover for the cylinder having a journal-bearing, and a revolving beater and scraper having a hollow axial shaft forming the inlet for the cream substantially as described.

AAGE JENSEN.

Witnesses:
EVA HUTCHISON,
FRANK T. BURNHAM.